United States Patent [19]

Jacobson

[11] 4,197,426
[45] Apr. 8, 1980

[54] REMOTE PLAYOUT TELEPHONE ANSWERING DEVICE

[76] Inventor: Sava Jacobson, 8130 Orion St., Van Nuys, Calif. 91406

[21] Appl. No.: 879,279

[22] Filed: Feb. 21, 1978

[51] Int. Cl.² ............................................. H04M 1/65
[52] U.S. Cl. .................... 179/6 E; 179/6 R; 179/1 HF; 328/206; 330/252; 330/259; 330/260
[58] Field of Search .................... 179/6 R, 6 E, 6 AC, 179/100.1 VC, 1 HF, 1 VL; 360/71, 67, 68, 63; 318/317, 332; 330/252, 259, 260; 328/206

[56] References Cited

U.S. PATENT DOCUMENTS

| | | | |
|---|---|---|---|
| 3,337,690 | 8/1967 | Martin | 179/6 E |
| 3,586,779 | 6/1971 | Chernack | 179/6 R |
| 3,894,188 | 7/1975 | Konno | 179/6 E |
| 3,935,390 | 1/1976 | Winterholter | 179/6 R |
| 3,978,289 | 8/1976 | Konno | 179/6 E |
| 4,006,310 | 2/1977 | Bayer | 179/1 VC |
| 4,025,728 | 5/1977 | Jacobson | 179/1 HF |
| 4,079,200 | 3/1978 | Meri | 179/100.1 VC |
| 4,119,801 | 10/1978 | Jacobson | 179/6 R |

Primary Examiner—Bernard Konick
Assistant Examiner—Alan Faber
Attorney, Agent, or Firm—Spensley, Horn, Jubas & Lubitz

[57] ABSTRACT

In this telephone answering device, the outgoing and incoming audio amplifiers are interconnected to function as a mode switching flip-flop. Remote playout is enabled upon detection of a first beep tone. This sets a control flip-flop which consists of a single operational amplifier interconnected with a steering capacitor to function as a toggleable bistable circuit. A cylindrical cam mechanism and associated control circuit are actuated by setting of the remote playout control flip-flop. These cooperate with a reel drive motor first to rewind the message tape and then to drive it forward as the recorded messages are played out via the telephone line to the user. Detection of a second beep tone resets the control flip-flop, terminating remote playout. The device employs a single sided solid state ring detector having a transformer input circuit that presents a balanced load to the telephone line, thereby permitting ac powered operation of the device.

8 Claims, 9 Drawing Figures

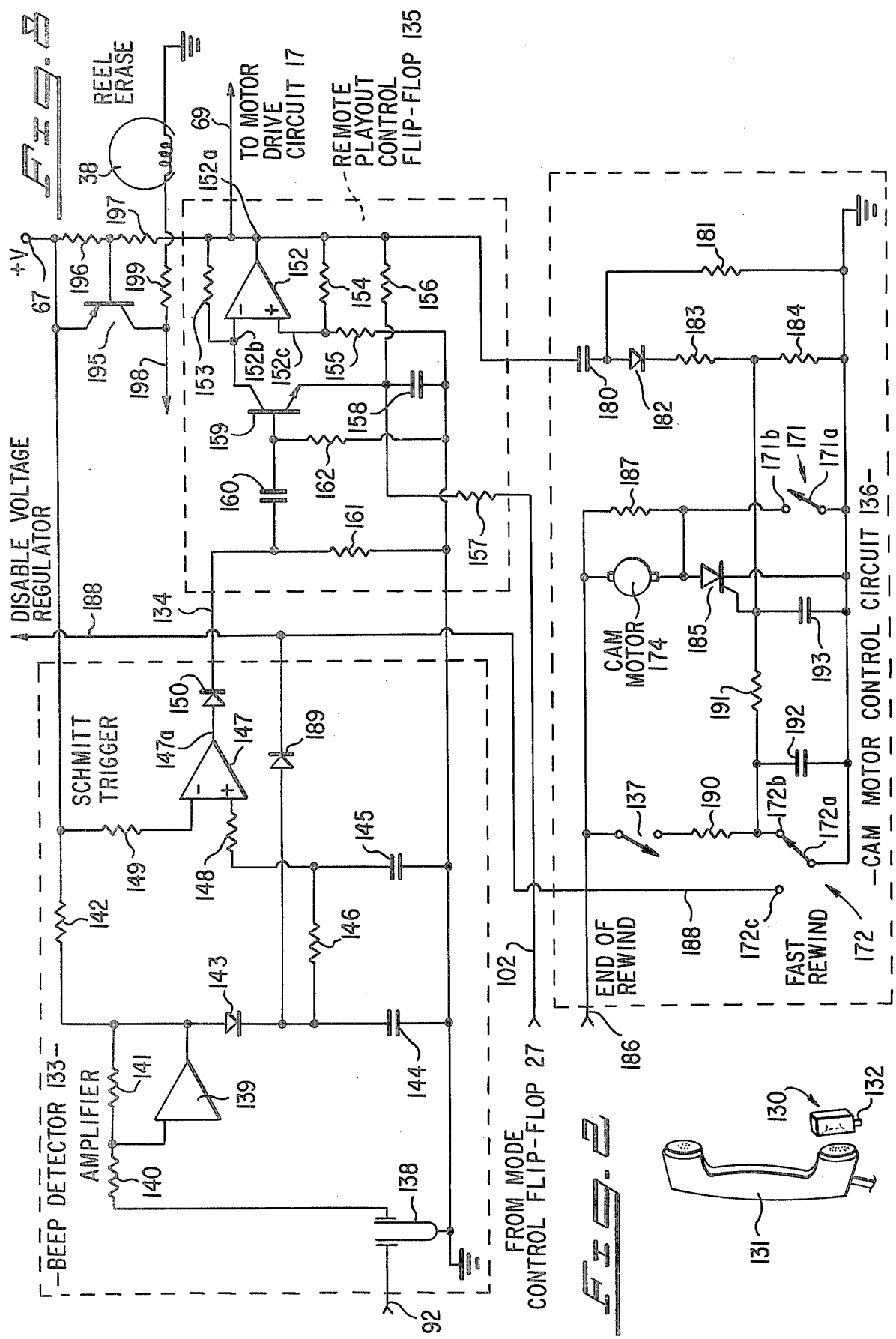

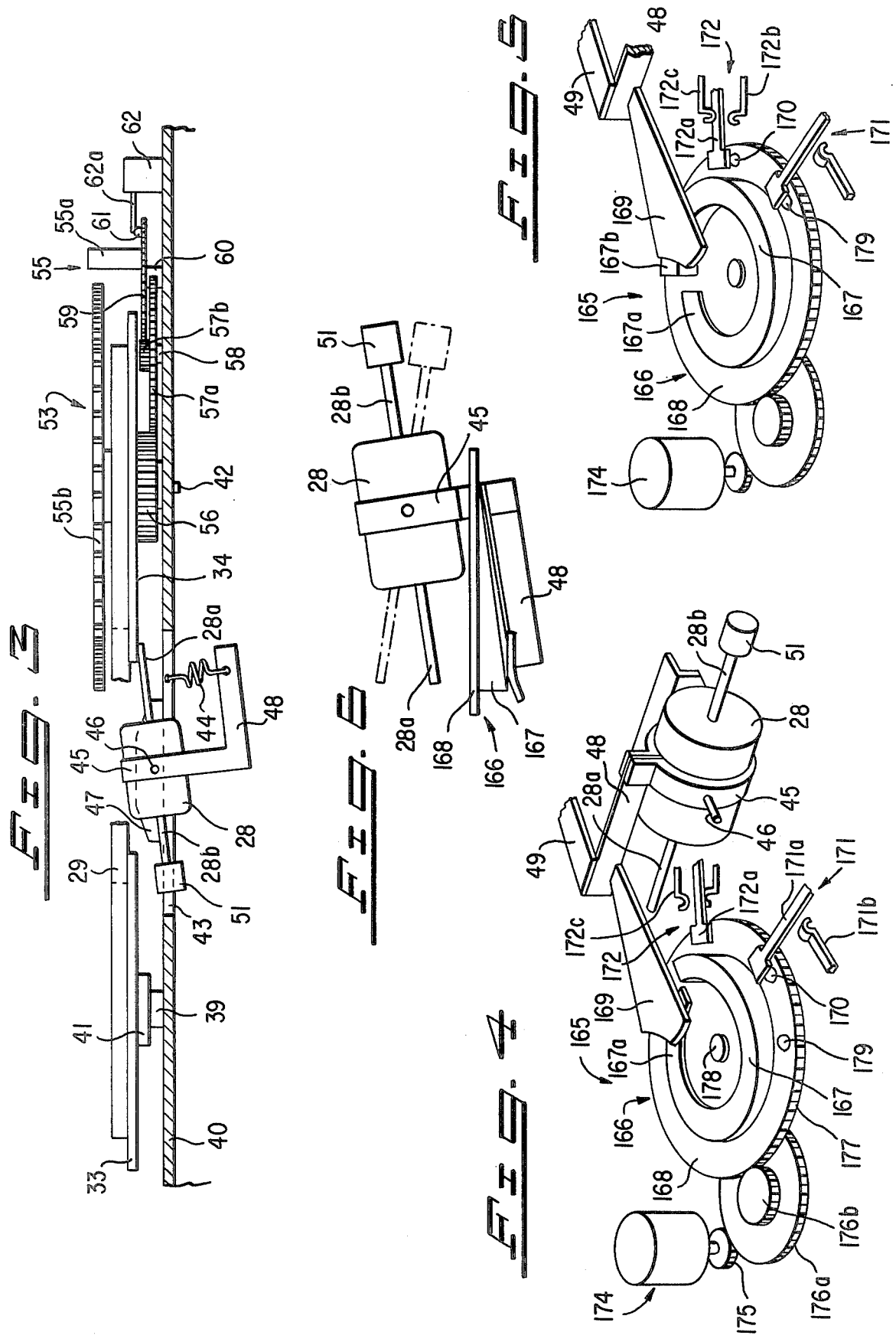

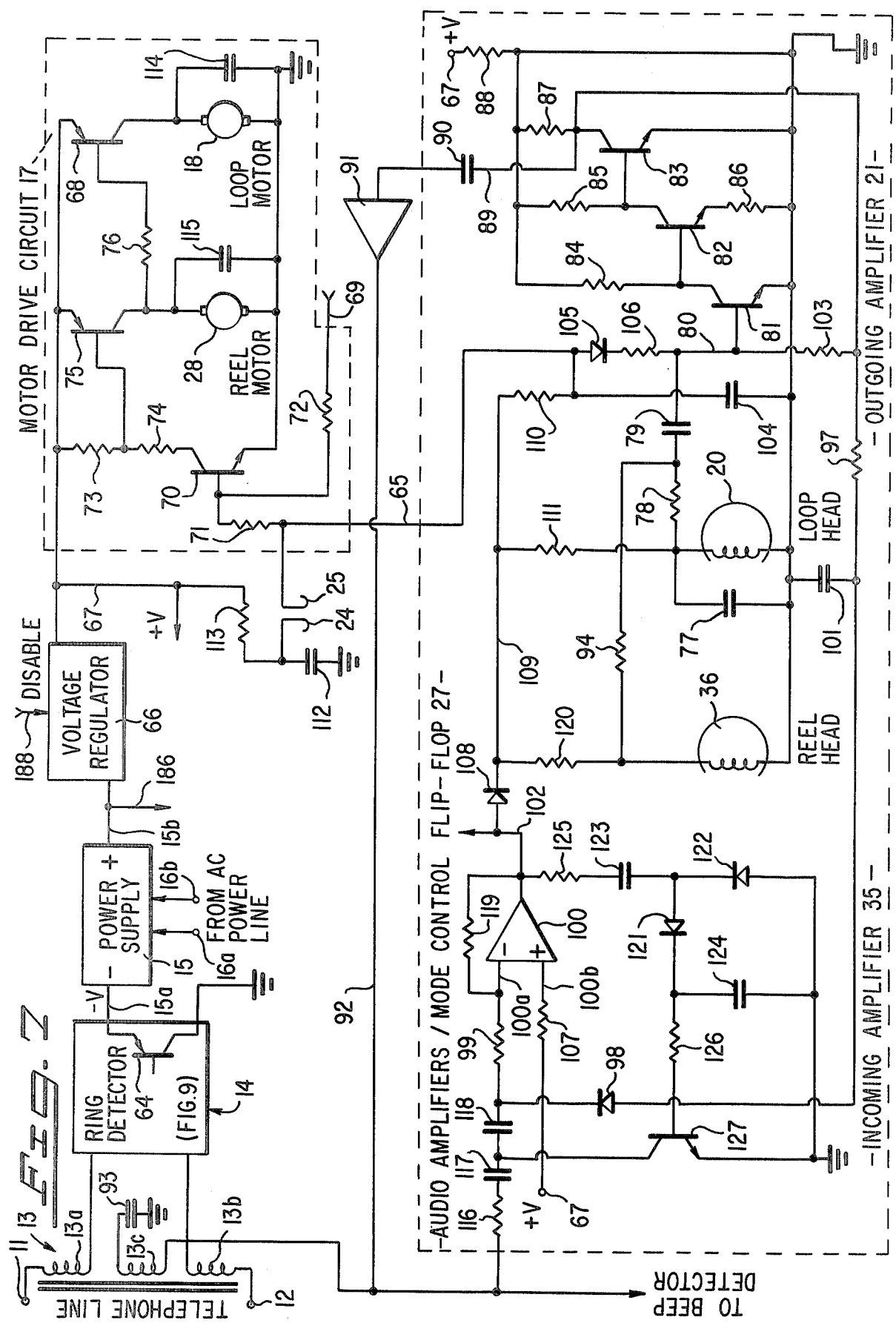

REMOTE PLAYOUT TELEPHONE ANSWERING DEVICE

BACKGROUND OF THE INVENTION

1. Field of the Invention

The present invention relates to a telephone answering device having remote controlled message playback capability.

2. Description of the Prior Art

Telephone answering devices have gained widespread acceptance for both home and office use. With such a device, no call goes unanswered, even when the user is away from his home or office.

A particularly useful feature of some answering devices is the ability of the user to have his messages played out automatically by remote control. Typically, when the user is away from his home or office and desires to hear his messages, he will call his own telephone number. When the device answers the telephone automatically, the user will transmit a beep tone via the telephone which will cause the answering device to switch into a remote playout mode. The tape containing the recorded incoming messages is quickly rewound, and then set to the forward direction to play back the recorded messages via the telephone line. When all of the messages have been played out, the device stop and reverts back to the answering mode.

In the past, such remote playout capability has necessitated complex mechanical and electronic arrangements, thereby considerably increasing the cost of the answering device. This increased cost often took the device out of the price range of the ordinary household user. A principal object of the present invention is to provide a telephone answering device having remote playout capability while using simple, inexpensive electronic and mechanical components.

Certain minimal functions must be achieved to accomplish remote playout. First, circuitry must be provided to detect the beep tone and to switch the device from the automatic answering mode to the remote playout mode in response to such detection. An electromechanical arrangement then must be provided first to rewind the tape on which the incoming messages have been recorded and then to drive the tape in the forward direction as the messages are played out over the telephone line to the user. A further mechanism must be provided to terminate the remote playout operation and to transfer the device back to the automatic answering mode when remote playout has been completed. Optionally, the device also may be configured to allow rewinding of the message tape after the recorded messages have been played out so that the full supply of tape is available to record subsequent incoming messages.

One approach of the prior art is typified by the apparatus shown in U.S. Pat. No. 3,067,289 to Zimmermann. There, as the incoming messages are recorded an integrating timer, mechanically coupled to the recorder, provides an index of the total elapsed recording time. When the tape is rewound in response to receipt of a remote control signal, the integrating timer retains its prior position. Then, as the recorded messages are played out to the user a cam is mechanically advanced. When the message playout time equals the elapsed recording time stored by the integrating timer, the cam closes a microswitch to terminate the playout operation.

In the prior art system just described, a complex mechanical arrangement is required to function as the integrating timer. Other prior art devices utilize different types of mechanical timers to control the playout duration of the recorded messages. An alternative approach, not requiring an integrating timer, is to have the user terminate the playout cycle after he has heard all of the messages. This is accomplished by having the user send a second beep control signal over the telephone line. This is detected by the device and used to terminate the playout operation. Another object of the present invention is to provide an improved, low-cost telephone answering device of this type in which the remote playout operation is terminated upon receipt of a second beep tone from the user.

Another factor which has added to the cost of prior art telephone answering devices involves the circuitry for mode switching. During the automatic answering cycle, the device must be able to switch from the outgoing announcement transmit mode to the incoming message record mode. In prior art devices this has often necessitated the use of one or more relays or independent flip-flop circuits. A further object of the present invention is to provide a unique mode control flip-flop arrangement in which the audio amplifiers used to amplify outgoing and incoming speech also are used as components of a mode control flip-flop, thereby eliminating the need for a separate flip-flop circuit.

Prior art devices also have employed relays or separate flip-flop circuits for motor drive control and for switching between the automatic answering and the remote playout modes. Another object of the present invention is to provide simplified motor drive circuitry which requires no relay or flip-flop but which facilitates the alternative supply of power to the loop drive motor or to the reel drive motor. Another object of the present invention is to provide a remote playout control flip-flop of unique circuitry employing only a single operational amplifier to perform a bistable switching function.

Another desirable feature of a telephone answering device is to have it powered from the commercial ac power line. This eliminates the cost and nuisance of battery replacement. However, as a result of the capacitive coupling in the ac power transformer, prior art ac powered answering device have had the shortcoming of presenting an unbalanced load to the telephone line. That is, one input terminal of the device may have presented a different capacitive impedance to ground to the telephone line than did the other input terminal. A further object of the present invention is to overcome this objectionable unbalanced load situation and to provide an ac powered answering device which presents a balanced load to the telephone line.

SUMMARY OF THE INVENTION

These and other objectives are achieved by the inventive telephone answering device in which multiple purpose circuitry and simplified mechanisms are used to accomplish mode switching and remote controlled playout. A ring detector utilizes a balanced input transformer and appropriate circuitry that presents a balanced load to the telephone line while permitting ac line power to be used to operate the device.

Switching from the announcement transmit mode to the incoming message record mode is accomplished using a unique mode control flip-flop circuit that consists of the outgoing and incoming audio amplifiers interconnected to operate as a bistable circuit in addition to performing the audio amplification function. This mode control flip-flop is coupled to a unique motor drive circuit which alternatively provides power to the loop drive motor or to the reel drive motor depending on the state of the mode control flip-flop during the answering cycle.

Remote playout is enabled in response to beep tone detection by a unique control flip-flop circuit which employs a single operational amplifier. Trigger steering circuitry cooperates with the amplifier to place the flip-flop in a first stable state, in which automatic answering is enabled, when power first is applied to the device in response to ring detection. Receipt of the first beep tone causes the flip-flop to switch to a second stable state in which remote playout is enabled. Subsequent detection of a second beep tone causes the same flip-flop to revert back to the first stable state, returning the device to the answering mode.

A cylindrical cam assembly is used to transfer the reel drive motor from the forward to the rewind position at the start of remote playout, and then to return the reel drive motor to the forward position when rapid rewind has been completed. The cam motor control circuitry is actuated when the remote playout control flip-flop is switched to its second stable state in response to receipt of a beep tone. Thereafter, its cycling is automatic. Circuitry interlocks are provided to ensure that the remote playout mode can only be entered during outgoing announcement transmission, and to ensure that the remote playout is not terminated inadvertently by beep detection during the automatic rewind operation.

BRIEF DESCRIPTION OF THE DRAWINGS

A detailed description of the invention will made with reference to the accompanying drawings, wherein like numerals designate corresponding elements in the several figures.

FIG. 3 is a side view of the incoming message tape reel drive assembly, as viewed on the line 3—3 of FIG. 1.

FIG. 4 is a pictorial view of the cam assembly used to tilt the incoming message tape reel drive motor from the forward to the reverse positions. The mechanism is shown "upside down," that is, as it would be seen when looking into the bottom of the telephone answering device of FIG. 1. The reel drive motor is in the forward position.

FIG. 5 is a pictorial view like FIG. 4, but with the cam assembly rotated to the position in which the reel drive motor is tilted to the rewind position.

FIG. 6 is a partial side view of the cam mechanism of FIG. 4, showing the alternative forward and rewind positions of the reel drive motor.

FIG. 7 is an electrical schematic diagram of the motor drive circuit and mode control flip-flop portions of the telephone answering device of FIG. 1.

FIG. 8 is an electrical schematic diagram of the cam motor control circuit, beep detector and remote playout control flip-flop circuits used in the telephone answering device of FIG. 1.

FIG. 9 is an electrical schematic diagram of the ring detector employed by the telephone answering device of FIG. 1 and utilizing a balanced transformer for connection to the telephone line.

DESCRIPTION OF THE PREFERRED EMBODIMENT

Figure 1:
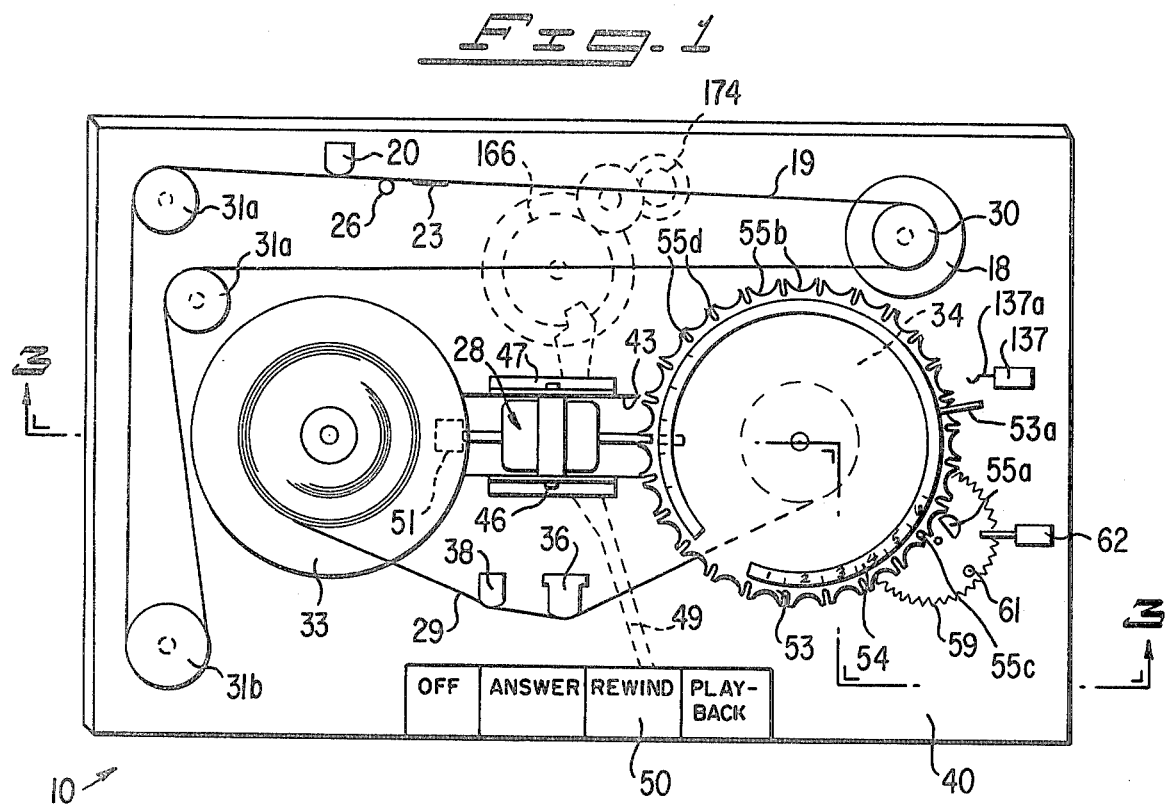
FIG. 1 is a top plan view of a telephone answering device in accordance with the present invention.

The following detailed description is of the best presently contemplated mode of carrying out the invention. This description is not to be taken in a limiting sense, but is made merely for the purpose of illustrating the general principles of the invention since the scope of the invention best is defined by the appended claims.

The inventive telephone answering device 10 (FIG. 1) is connected to a telephone line, 11, 12 (FIGS. 7 and 9) via a balanced transformer 13, and functions automatically to answer calls received from that line. When a ring signal occurs, a ring detect circuit 14 (FIG. 9) connects dc power from a supply 15 to the device 10. The power supply 15 itself is connected to the ac power line via a pair of terminals 16a, 16b.

When power is thus applied at the beginning of the automatic answering cycle, a motor drive circuit 17 (FIG. 7) turns on a motor 18 which drives a tape loop 19 (FIG. 1). A prerecorded outgoing announcement, typically indicating that the call is being answered automatically, is picked up from the tape loop 19 by a loop playback head 20 (FIGS. 1 and 7). The announcement is amplified by an outgoing amplifier 21 (FIG. 7) and transmitted to the telephone line via the balanced transformer 13.

Advantageously, the tape loop 19 includes an electrically conductive strip 23. After transmission of the complete outgoing announcement, the strip 23 electrically shorts a pair of contacts 24, 25, (FIG. 7) that are supported on a terminal post 26 (FIG. 1). This causes a mode control flip-flop 27 (FIG. 7) to change state, thereby causing the motor drive circuit 17 to disable the loop motor 18 and to energize a reel drive motor 28 which drives a magnetic tape 29 (FIG. 1) on which messages incoming from the telephone line are recorded. The tape loop 19, which had been rotating about a drive pulley 30 and support pulleys 31a–31c, now remains stationary for the rest of the answering cycle.

As shown in FIGS. 1 and 3, the magnetic tape 29 is wound from a supply reel 33 onto a take-up reel 34. As the incoming message is received from the telephone line via the balanced transformer 13, it is amplified by an incoming amplifier 35 (FIG. 7) and recorded on the tape 29 via a reel record/playback head 36 (FIGS. 1 and 7). At the same time, any material previously recorded on the tape is erased by a reel erase head 38 (FIGS. 1 and 8).

As seen in FIG. 3, the tape supply reel 33 is mounted to rotate about a shaft 39 which extends vertically above a horizontal chassis or mounting plate 40. A friction plate 41 of felt or like materials damps the free rotation of the reel 33, so as to prevent the tape 29 from spilling off the supply reel 33.

The take-up reel 34 is journal-mounted on a shaft 42 which extends vertically from the chassis 40. The reel drive motor 28 is pivotally mounted in an opening 43 through the chassis 40. A drive shaft 28a, 28b extends from both ends of the motor 28. A spring 44 normally biases the motor 28 to the tilted position shown in FIG. 3 wherein the shaft 28a contacts the undersurface of the take-up reel 34 so as to drive the tape 29 in the forward direction.

The pivotal mounting of the motor 28 includes a strap 45 that surrounds the motor housing, midway between the ends thereof. A pair of pivots 46 project laterally from the strap 45 through mounting holes in a respective pair of brackets 47 (FIGS. 1 and 3). This arrangement facilitates tilting of the drive motor 28 about a horizontal axis that is perpendicular to the axis of the motor drive shaft 28a, 28b.

An arm 48 extends from the strap 45 parallel to, and in the same direction as the shaft 28a. This arm 48 is mechanically connected by a link 49 (FIG. 4) to a REWIND button 50 (FIG. 1) on the device 10. To rewind the tape 29 the REWIND button 50 is depressed. By means of the link 49, this pivots the arm 48 downward (as viewed in FIG. 3) so as to tilt the motor 28 about the pivots 46 until a cylindrical member 51 at the end of the shaft 28b contacts the underside of the supply reel 33. This causes the supply reel to rotate in the rewind direction, at a rate which is greater than the rotation of the reel 34 in the forward direction. As described below in connection with FIGS. 4 through 6, the motor 28 also is tilted to the rewind orientation, without depression of the REWIND button 50, in connection with the automatic, remote controlled playback of recorded messages.

An indicator wheel 53 (FIGS. 1 and 3) having a numbered scale 54 on its upper surface gives a visual indication of the total number of incoming messages that have been recorded since the tape 29 last was rewound.

A Geneva movement 55 advances the indicator wheel 53 by one count position each time an incoming message is recorded. To this end, as the reel 34 rotates counterclockwise to take up the tape 29 as a message is received, a gear 56, affixed to the underside of the reel 34, rotates in the same direction. This gear 56 drives a pair of gears 57a, 57b mounted on a shaft 58. The gear 57b in turn drives another gear 59 mounted on a shaft 60. The dimensions of the gears 56, 57a, 57b and 59 are selected so that the gear 59 will make one complete revolution in the time available to record an incoming message. A vertical pin element 55c of the Geneva movement 55, mounted atop the gear 59, cooperates with a set of notches 55d at the periphery of the indicator wheel 53. Each time the gear 59 begins its single revolution as an incoming message is recorded, the pin 55c will engage a notch 55d and quickly rotate the indicator wheel 53 in a clockwise direction by one count position. For the remainder of the message recording time, as the gear 59 completes the single revolution, a crescent-shaped element 55a will engage a recess 55b in the indicator wheel 53 and prevent it from rotating further. As a result, the next subsequent numeral on the scale 54 will become visible beneath a window (not shown) in the cover of the device 10 and will remain stationary until the next message is recorded.

Also affixed to the top of the gear 59 is a raised boss 61 which engages the arm 62a of a "STOP" switch 62 (FIGS. 1, 3 and 9). The switch 62 normally is open, but is closed when the boss 61 engages the arm 62a. As described below, such closure terminates the answering cycle and causes dc power from the supply 15 to be disconnected from the motors and circuitry of the device 10. With this arrangement, the time duration of the incoming message record portion of the answering cycle is established by the rotation rate of the take-up reel 34 and the gear ratios of the gears 56, 57a, 57b and 59.

Automatic Answering Operation

In the automatic answering mode, the telephone line 11, 12 is connected to the ring detector 14 via separate primary windings 13a, 13b of the balanced transformer 13 (FIG. 7). When a ring signal is detected, a switch in the form of a transistor 64 is closed so as to connect the minus terminal 15a of the power supply 15 to circuit ground. This turns on dc power to the various circuits of the device 10, and thereby starts the answering cycle.

When power thus initially is applied, the mode control flip-flop 27 assumes a first stable state in which the dc voltage level on a line 65 is low. As described below, the flip-flop 27 is a unique circuit consisting of the outgoing audio amplifier 21 and the incoming audio amplifier 35 interconnected in such a manner to operate as a bistable device. In the initial stable state, with the line 65 low, the outgoing amplifier 21 is operative and the incoming amplifier 35 is disabled.

As answering begins, the motor drive circuit 17 supplies regulated dc power only to the loop motor 18. The current path to the loop motor 18 is from the positive terminal 15b of the power supply 15 via a voltage regulator 66, a +V line 67 and a conducting transistor 68. At the beginning of the automatic answering cycle, the control signal on the line 65 and another control signal (described below in conjunction with the remote playout operation) on a line 69 both are low. As a result, both inputs fed to a transistor 70 via a pair of resistors 71, 72 are low, and the transistor 70 is off. As a result, a relatively high positive voltage is supplied from the junction of a pair of resistors 73, 74 in the collector circuit of the transistor 70 to the base of a transistor 75. The transistor 75 thus is off, and no current is supplied to the reel motor 28. A low signal is supplied via a resistor 76 to the base of the transistor 68, causing conduction of that transistor and turning on the loop motor 18. This drives the loop 19, and initiates transmission of the outgoing announcement.

This announcement is picked up by the loop head 20, which is shunted by a capacitor 77, and fed via a resistor 78 and a capacitor 79 to the input line 80 of the outgoing amplifier 21. The amplifier 21 includes three transistors 81, 82, 83 connected in cascade via a set of resistors 84-87. The amplifier 21 receives dc power from the +V line 67 via a resistor 88.

The amplified announcement from the loop head 20 is supplied by the outgoing amplifier 21 to the telephone line 11, 12 via a line 89, a capacitor 90, another amplifier 91 and a line 92 which leads to one terminal of a secondary winding 13c on the transformer 13. The other terminal of the winding 13c is connected to ground via a capacitor 93. During transmission of the outgoing announcement, the reel head 36 also is connected to the enabled outgoing amplifier 21 via a resistor 94 and the capacitor 79. However, since the reel motor 28 is disabled, the tape 29 is stationary and no audio is picked up by the reel head 36.

When the amplifier 21 is enabled, the outgoing audio on the line 89 is superimposed on a positive dc voltage which is approximately one-half of the value +V present on the line 67. This dc level on the line 89 is used to disable the incoming amplifier 35. To this end, the line 89 is connected via a resistor 97, a diode 98 and a resistor 99 to the inverting (−) input 100a of an operational amplifier 100. The junction between the resistor 97 and the diode 98 is bypassed to ground via a capacitor 101. When the outgoing amplifier 21 is on, the dc level supplied from the line 89 to the inverting input 100a causes the output of the amplifier 100, on a line 102, to be a low dc level near ground potential. Thus audio amplification by the amplifier 35 is inhibited. The flip-flop 27 thus achieves a first stable state in which the dc level on the line 89 is high, and the dc levels on the lines 65 and 102 are low. The three transistors 81–83 are connected to simulate an operational amplifier having the same characteristics as the amplifier 100, which itself may comprise one section of a type LM3900 integrated circuit available commercially. The input line 80 comprises the inverting input of the amplifier 21. Feedback is provided by a resistor 103.

A capacitor 104 is used to ensure that the mode control flip-flop 27 will assume the first stable state, with the outgoing amplifier 21 enabled, when dc power first is applied at the beginning of the answering cycle. To this end, the capacitor 104 is connected via a diode 105 and a resistor 106 to the amplifier input line 80. During the quiescent period prior to ring detection, the capacitor 104 is discharged. Thus when dc power first is applied, the line 65 at the junction between the capacitor 104 and the diode 105 will be held low by the initially discharged condition of the capacitor 104. A positive voltage will be supplied via the line 67 and a resistor 107 to the non-inverting (+) input 100b of the amplifier 100. As a result, the amplifier output terminal 102 will try to go positive and to supply a positive voltage via a diode 108, a line 109, a resistor 110 and the line 65 to the capacitor 104. However, since the capacitor 104 initially is discharged, the voltage at the line 65 can rise only slowly and initially will be low. Thus the inverting input 80 of the amplifier 21 will be low, so that the amplifier 21 will go on, and the dc level on the line 89 will go high. This will drive the incoming amplifier 35 off, causing the voltage on the line 102 to be low. Thus the mode control flip flop 27 will assume the desired first stable state.

During transmission of the outgoing announcement, a capacitor 112 (FIG. 7) will be charged to the +V level via a resistor 113. Advantageously, the capacitor 112 has a considerably greater capacitance (typically in the order of ten-to-one) than the capacitor 104. At the end of announcement transmission, when the conductive strip 33 on the loop 19 (FIG. 1) shorts the contacts 24, 25 the positive charge on the capacitor 112 will be supplied via the diode 105 and the resistor 106 to the inverting input terminal 80 of the outgoing amplifier 21. This positive voltage will turn off the outgoing amplifier 21. As a result, the dc level on the line 89 will drop to near ground, so that the incoming amplifier 35 no longer will be inhibited.

The positive bias supplied via the resistor 107 to the non-inverting input 100b will cause the amplifier 100 to go on. As a result, a positive dc level on the order of +V/2 will be present on the line 102. This positive voltage will be supplied via the diode 108, the resistor 110, the diode 105 and the resistor 106 to the input terminal 80 of the outgoing amplifier 21. As a result, the outgoing amplifier 21 will be disabled. This establishes the second stable state of the mode control flip-flop 27 in which the dc level on the line 89 is low and the dc level on the line 65, supplied via the amplifier output terminal 102, the diode 108 and the resistor 110, is high. (This second stable state is used when recording a new announcement on the loop 19 using the enabled amplifier 35 connected to the loop head 20 via a resistor 111).

When the signal on the line 65 goes high, the motor drive circuit 17 will turn off the loop motor 18 and turn on the reel motor 28. This results since the high signal on the line 65 turns on the resistor 70, resulting in turn on of the transistor 75. Current is supplied from the line 67 via the transistor 75 to the reel motor 28. The resultant high signal supplied via the resistor 76 cuts off the transistor 68 thereby disconnecting power from the loop motor 18. A capacitor 114 suppresses inductive transients which may occur when the loop motor 18 goes off. A similar transient suppression capacitor 115 shunts the reel motor 28.

In the manner just described, shorting of the terminals 24, 25 causes the mode control flip-flop 27 to assume its second stable state in which the outgoing amplifier 21 is disabled and the incoming amplifier 35 is enabled. The resultant high control signal on the line 65 causes the motor drive circuit to turn off the loop motor 18 and to turn on the reel motor 28. The device 10 thus is conditioned to record a message incoming from the telephone line.

This incoming message is picked up by the transformer secondary winding 13c and supplied via the line 92 to the incoming amplifier 35. The audio passes through a resistor 116, a pair of capacitors 117, 118 and the resistor 99 to the input terminal 100a of the amplifier 100. The audio gain of the amplifier 100 is established by a feedback resistor 119. The amplified incoming message is supplied from the amplifier 100 to the reel record/playback head 36 via the line 102, the diode 108 and a resistor 120. Recording of the incoming message is accomplished.

Advantageously, the incoming amplifier 35 is provided with an automatic level control circuit comprising a pair of diodes 121, 122, a pair of capacitors 123, 124, a pair of resistors 125, 126 and a transistor 127. The collector-to-emitter path of the transistor 127 is connected between the junction of the amplifier input capacitors 117, 118 and ground. A portion of the audio output from the amplifier 100 is rectified by the diodes 121, 122 and used to derive across the capacitor 124 a dc control signal for the transistor 127. As the audio level rises, this control signal causes increased conduction of the transistor 127, thereby shunting a portion of the input audio to ground, and effectively decreasing the overall gain of the incoming amplifier 35. Level control is achieved.

At the end of the incoming message record period, the boss 61 (FIGS. 1 and 3) closes the switch 62. This results in turn-off of the transistor 64 (FIG. 7), disconnecting dc power from the device 10. The answering cycle terminates.

REMOTE PLAYOUT OPERATION

Figure 2:
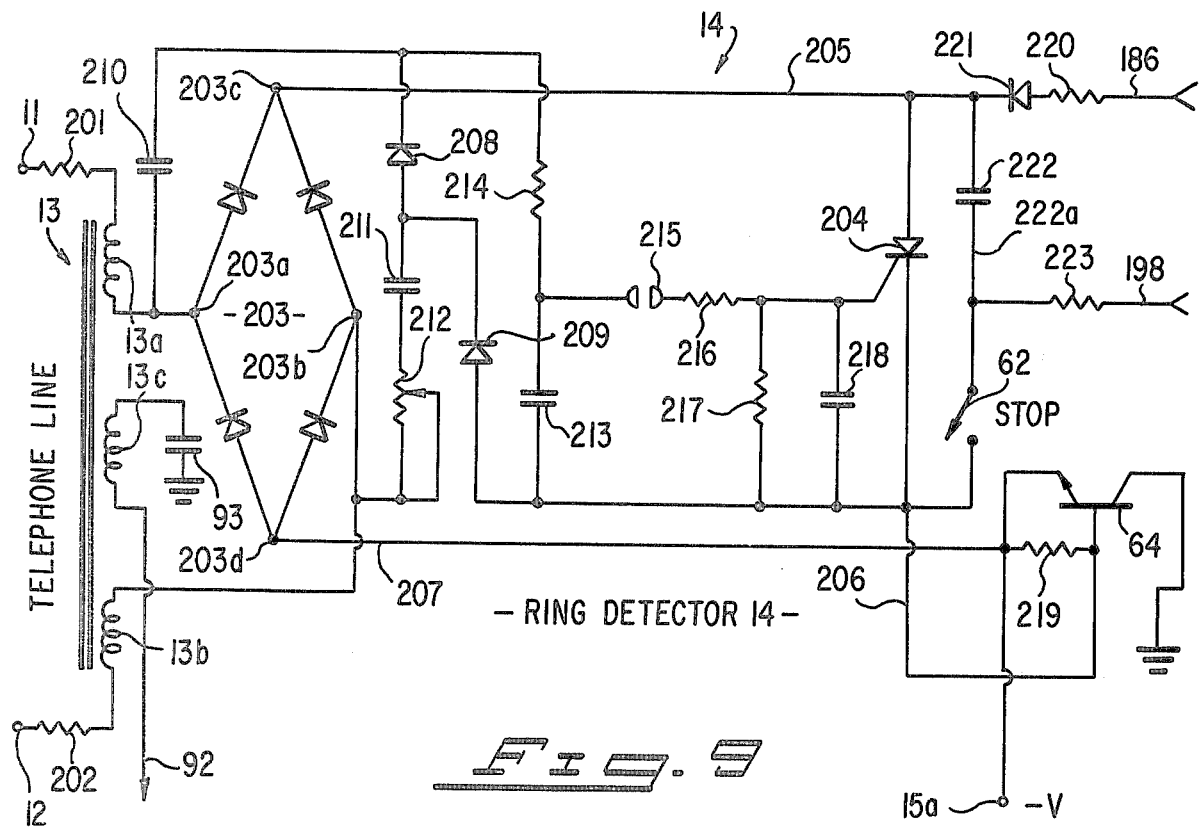
FIG. 2 is a pictorial view of a typical beep tone oscillator used for remote actuation of the telephone answering device of FIG. 1.

Incoming messages which have been recorded on the tape 29 by the device 10 can be played out under remote control. To accomplish this from a remote telephone, the user dials his own number. The call will be answered by the device 10 as described above. To initiate the remote playout operation, the user transmits a beep tone to the device 10 during transmission of the outgoing announcement. This may be accomplished by using a battery powered audio oscillator and acoustic transducer (e.g., a small loudspeaker) contained in a hand-held package 130 (FIG. 2). The package 130 is held against the mouthpiece of the remote telephone handset 131 and a push-button 132 is depressed to transmit the beep tone.

As described below, receipt of this beep tone will cause the device 10 to switch from the normal answering mode into the remote playout mode. The tape 29 first will be rewound and then driven in the forward direction while the recorded incoming messages are transmitted via the telephone line to the user. When the user has heard all of the messages, he depresses the pushbutton 132 once again. This transmits another beep tone to the device 10. Upon receipt of this second beep tone the device 10 reverts back to the normal answering mode, completes the answering cycle and shuts off in preparation for receipt of the next incoming call.

The user can also accomplish remote controlled rewinding of the tape 21 to its beginning position, and thereby make available the entire source of tape for the recording of additional incoming messages. This is done in the following way. The user first accomplishes remote playback of the recorded messages by sending a first beep tone to the device 10 using the oscillator package 130. When he has heard all of the messages, the user sends the second beep tone. The device 10 reverts back to the automatic automatic answering mode and continues transmission of the outgoing announcement. While the announcement is still playing, the user sends a third beep tone from the package 130. Again the device 10 switches to the remote playout mode, rewinds the tape 29 and begins playout of the recorded messages. When the user hears the start of the first message, he depresses the pushbutton 132 for a fourth time. Receipt of the resultant beep tone causes the device 10 immediately to switch back to the automatic answering mode. This now occurs with the tap 29 substantially fully rewound. All of the tape is available to record future incoming messages.

To accomplish this automatic playout operation, the device 10 includes a beep detector 133 (FIG. 8) which receives audio from the telephone line via a transformer secondary 13c and the line 92. Upon detection of the beep tone, a control signal is supplied via a line 134 from the beep detector 133 to a remote playout control flip-flop 135. This switches the flip-flop 135 from a first stable state in which automatic answering is enabled and in which control signal on the line 69 is low to a second stable state in which remote playout is enabled and in which the signal on the line 69 is high.

In response to such switching of the control flip-flop 135, the motor drive circuit 17 turns off the loop motor 18 and turns on the reel motor 28. Also, a cam motor control circuit 136 (FIG. 8) accomplishes mechanical tilting of the reel motor 28 into the rewind position, so as to rewind the tape 29. When rewinding is complete, a switch 137 (FIGS. 1 and 8) is closed which causes the cam motor control circuit 136 to return the reel drive motor 28 back to the forward position. The tape 29 then is driven in the forward direction, and recorded messages are picked up by the reel head 36, amplified by the outgoing amplifier 21 and transmitted to the user via the telephone line.

Receipt of the next beep tone causes the beep detector 133 to produce another control signal on the line 134. This returns the control flip-flop 135 to its initial state, terminating the remote playout, causing the motor drive circuit 17 again to turn on the loop motor 18 and to turn off the reel motor 28, and returning the device 10 to the answering mode.

To ensure that only the authorized user of the device 10 can obtain remote-controlled playout of the recorded messages, the beep detector 133 is responsive only to a beep tone of a specific audio frequency. This frequency is established by a mechanical filter 138 (FIG. 8) which only passes audio signals in a very narrow frequency range (typically about 3 Hz wide at the selected beep tone frequency which typically may be between 1 kHz and 3 kHz).

If a beep tone at the proper frequency is received, it will be fed from the telephone line via the transformer winding 13c, the line 92 and the filter 138 to an amplifier 139 having an input resistor 140, a feedback resistor 141 and a load resistor 142. The resultant audio output signal will be rectified by a diode 143 to produce a dc control signal that is filtered by a pair of capacitors 144, 145 and a resistor 146. When the resultant dc signal across capacitor 145 reaches a certain threshold level, it causes a Schmitt trigger to produce high output on a line 147a. The Schmitt trigger consists of an operational amplifier 147, an input resistor 148 and another resistor 149 connected between the +V line 67 and the inverting input of the amplifier 147. Normally, the current provided via the resistor 149 causes the amplifier 147 output to be low. When a beep signal is detected, the current supplied via the resistor 148 exceeds that supplied via the resistor 149, thereby causing the amplifier output line 147a to go to a relatively high dc potential level. This signal on the line 147a is supplied via a diode 150 to the line 134 where it is used to operate the remote playout control flip-flop 135.

The flip-flop 135 itself is a unique circuit which employs only a single operational amplifier 152, typically one section of a type LM3900 integrated circuit. The output terminal 152a of the amplifier 152 is connected directly to the control line 69 and via a resistor 153 back to the inverting input terminal 152b. The amplifier output terminal 152a also is connected to a first voltage divider consisting of a pair of resistors 154 and 155. The resistance value of the resistor 154 is selected to be substantially lower than the value of the resistor 153. For example, resistor 153 may be 820 kohm and the resistor 154 may be 100 kohm. The junction between the resistors 154 and 155 is connected to the noninverting input 152c of the amplifier 152.

When dc power first is applied to the device 10 at the beginning of the answering cycle, the flip-flop 135 will assume a first stable state in which the dc voltage level at the output terminal 152a is quite low. This is accomplished in the following manner. Each of the input terminals of the amplifier 152 has a non-zero threshold level, typically on the order of 0.6 volts, so that no current can flow into either input terminal until this threshold is exceeded. At turn-on, the output terminal 152a starts to rise, and current is fed via the resistor 153 to the inverting input 152b. The values of the resistors 154 and 155 are selected to divide the output voltage by about 3-to-1, so that when the output potential reaches the threshold level (typically 0.6 volts), the divided voltage at the input 152c will be below the threshold of that terminal. As a result, the amplifier 152 will stabilize at a first state at which the potential at the terminal 152 and on the line 69 is on the order of 0.6 volts. This low voltage is insufficient to turn on the transistor 70 in the motor drive circuit 17, thereby ensuring that the reel motor 28 will be off and the loop motor 18 will be on at the beginning of the answering cycle.

The flip-flop 135 is provided with a second voltage divider consisting of a pair of resistors 156 and 157 connected in series between the amplifier output terminal 152a and the line 102 from the mode control flip-flop 27. A steering capacitor 158 is connected from the junction of the resistors 156, 157 to ground. The values of the resistors 156 and 157 are selected so that when the flip-flop 135 is in its first state, with the potential at the terminal 152a, low, the divided potential across the capacitor 158 will be substantially below the threshold level of the input terminal 152b.

A switching transistor 159 is connected between the input terminal 152b and the capacitor 158. This transistor 159 normally is off, but is turned on by the signal on the line 134 which occurs upon recipt of a beep tone. To this end, the line 134 is connected via a capacitor 160 and a pair of resistors 161, 162 to the base of the transistor 159. When the first beep tone is received, the signal on the line 134 momentarily turns on the transistor 159. This connects the inverting input terminal 152b to the capacitor 158, which is now charged to a low level substantially below the threshold of that input terminal 152b. As a result, no current flows into the inverting terminal 152b. The output terminal 152a begins to rise in potential, and soon reaches a level at which the divided voltage supplied to the non-inverting input 152c exceeds the threshold of that terminal. As a result, the flip-flop 135 quickly assumes its second stable state in which the output terminal 152a is at a relatively high dc potential. As described below, the resultant high signal on the line 69 conditions the device 10 to operate in the remote playout mode.

While the flip-flop 135 is in this second stable state, the capacitor 158 is charged to a relatively high dc potential. Thus when the next beep tone is detected, the resultant signal on the line 134 again momentarily turns on the transistor 159 so as to connect the capacitor 158 to the amplifier input terminal 152b. The high voltage on the capacitor 158 now is fed to that inverting input and causes the amplifier 152 to revert back to a low output level. That is, the flip-flop 135 is switched back to its first stable state. The resultant low signal on the line 69 causes the device 10 to revert back to the answering mode. Successive detected beep tones will cause the flip-flop 135 to toggle between the first and second stable states.

During remote playout of the recorded messages it is necessary that the outgoing amplifier 21 (FIG. 7) be operative. As dicussed above, this condition exists during transmission of the outgoing announcement when the device 10 is operating in the answering mode. Thus in the embodiment illustrated, it is necessary to ensure that the device 10 is switched into the remote playout mode only during the announcement transmit portion of the answering cycle. This is accomplished by connecting the line 102 from the mode control flip-flop 27 via the resistor 157 to the steering capacitor 158. When the device 10 is operating in the incoming message record mode, the line 102 will be at a high dc potential. This will charge the capacitor 158 to a high dc potential even though the flip-flop 135 is in its first state with the output terminal 152a at a low dc level. As a result, if the first beep tone is detected during operation in the incoming record mode, when the transistor 159 is momentarily switched on, the high potential across the capacitor 158 will be supplied to the input terminal 152b. As a result, the amplifier 152 will maintain its low output level. That is, the flip-flop 135 will not switch states and the device will remain in the answering mode and will not switch to remote playout operation.

When remote playout is enabled in response to the initial receipt of a beep tone, a high signal is produced on the control line 69. As noted above, this causes the motor drive circuit 17 to turn off the loop motor 18 and to turn on the reel motor 28. The signal on the line 69 also causes the cam motor control circuit 136 to accomplish mechanical tilting of the reel motor 28 to the rewind position. To this end, the device 10 includes a rewind mechanism 165 shown in FIGS. 4, 5 and 6. The mechanism 165 includes a cam 166 that is used to tilt the motor 28 from its normal forward position to the reverse position. The cam 166 includes a spiral cam surface 167 which projects from a planar disc 168. A cam follower 169 extends from the arm 48 attached to the motor strap 45, and engages the spiral cam surface 167.

In the position shown in FIG. 4, the cam follower 169 is situated near the beginning 167a of the cam surface 167. In this orientation, the spring 44 biases the motor 28 into the forward position shown in FIG. 3. A boss 170 mounted on the disc 168 holds a switch 171 (GIGS. 4 and 8) open by spreading a contact arm 171a away from the associated contact 171b. A second switch 172 includes an arm 172a which normally touches a first contact 172b but is separated from a second contact 172c.

As described below, upon receipt of a first beep tone the high signal on the line 69 causes a motor 174 (FIGS. 1, 4, 5 and 8) to be turned on. This motor 174 drives the cam 166 (in a clockwise direction as viewed in FIGS. 4 and 5) by means of a set of gears 175, 176a, 176b and a gear 177 at the periphery of the cam disc 168.

As the cam 166 rotates about a shaft 178 affixed to the chassis 40, the cam follower 169 rides up the cam surface 167 until it reaches the position shown in FIG. 5. This causes the motor 28 to pivot into the rewind orientation, as shown in solid lines in FIG. 6. In this position, the cam follower 169 is atop the high end 167b of the spiral cam surface 167. Also in this position, the boss 170 will transfer the arm 172a of the switch 172 into contact with the terminal 172c. A second boss 179 will cause the switch 171 to open. When this occurs, power will be disconnected from the motor 174 so that the cam 166 will remain in the position shown in FIG. 5. Since the reel drive motor 28 is enabled, the tape 29 rapidly will be rewound.

When rewinding is completed, all of the tape 29 will be wound on the supply reel 33. When this occurs, an arm 53a affixed to the indicator wheel 53 will press against the feeler arm 137a (FIG. 1) of the switch 137 and cause that switch to close. As a result, the cam motor 174 once again will be energized. The motor 174 will rotate the cam 166 further in the clockwise direction until the cam follower 169 "falls off" the end 167b of the cam surface 167. The spring 44 will cause the motor 28 to pivot back to the forward orientation illustrated in FIGS. 3 and 4. The boss 170 again will open the switch 171 so as to stop the motor 174 and maintain the mechanism 165 in the position shown in FIG. 4 with the reel drive motor 28 in the forward position.

The tape 29 now is driven forward and the recorded incoming messages are played out to the telephone line. During such playout, the audio is picked up by the reel head 36 (FIGS. 1 and 7), amplified by the outgoing amplifier 21, and supplied to the telephone line via the transformer 13.

The circuit 136 for controlling the cam motor 174 is shown in FIG. 8. There the switches 137, 171 and 172 are shown in the positions for normal answering operation, with the mechanism 165 in the orientation shown in FIG. 4. Upon detection of the first beep tone, when the control flip-flop 135 switches to the state in which the signal on the line 69 is high, a cam motor start pulse is obtained by differentiating the signal on the line 69 using a capacitor 180 and a resistor 181. The resultant trigger pulse is supplied via a diode 182 and a voltage divider formed by a pair of resistors 183, 184 to the gate of a silicon controlled rectifier (SCR) 185. This turns on the SCR 185 and connects unregulated dc power to the cam motor 174 via the path from the positive terminal 15b of the power supply 15 (FIG. 7) and a line 186 through the cam motor 174 and the SCR 185 to ground. A resistor 187 connected across the motor 174 insures continued current flow through the SCR 185 even in the event of momentary open circuits through the brushes of the motor 174.

The cam motor 174 now starts to drive the cam 166 from the position shown in FIG. 4 to the position shown in FIG. 5. As soon as the cam rotation begins, the boss 170 moves away from the switch arm 171a so that the switch 171 is closed. This results in a short circuit across the SCR 185 (FIG. 2) so that the SCR turns off. However, the motor 174 continues to turn, since its current supply path now is completed via the closed switch 171.

When the cam mechanism 165 reaches the position shown in FIG. 5, the boss 179 opens the switch 171. This disconnects power from the motor 174 and causes the mechanism 165 to remain in the orientation shown in FIG. 5 with the reel drive motor 28 in the rewind position. The boss 170 transfers the switch arm 172a into contact with the terminal 172c so that a line 188 is connected to ground. This has two results. First, it disables the voltage regulator 66 so that the full dc voltage from the power supply 15 is supplied to the reel motor 28. As a result, the motor 28 runs at maximum speed and rewind is accomplished in the least time. Secondly, grounding of the line 188 ensures that the device 10 will not respond to a beep tone, and switch back to the answering mode, while the tape 29 is being rewound. Were this to occur, the motor drive circuit 17 would disconnect power from the reel motor 28 and the inertia of the reel 33 may cause spillage of the tape 29. Also, the reel drive motor 28 would remain in the rewind position, so that when the incoming message record portion of the answering cycle was reached, the tape 29 would be driven backward instead of forward.

To disable the beep detector during automatic rewind, a diode 189 (FIG. 8) is connected between the diode 143 and the line 188. Thus when the switch 172 contacts the terminal 172c, the output of the diode 143 effectively is shorted to ground via the diode 189. Thus if a beep tone should occur during rewind, the dc level across the capacitor 144 will remain at ground potential so that the Schmitt trigger circuit will not be actuated. No control signal will occur on the line 134 and the control flip-flop 135 will remain in the remote playout enable state.

When rewind is complete, switch 137 will close. As seen in FIG. 8, this will again trigger on the SCR 185. The trigger pulse is obtained via the closed switch 137, a pair of resistors 190, 191 and a pair of capacitors 192, 193. Note that when the switch 137 first is closed at the end of rewind, the switch arm 172a is still in contact with the terminal 172c so that the capacitor 192 is not shorted. Triggering of the SCR 185 causes the cam motor 174 to go on, again rotating the cam 166 in the clockwise position as seen in FIG. 5. As soon as the boss 179 moves away from the switch arm 171a, the switch 171 closes so as to provide power directly to the motor 184 and to turn off the SCR 185. The cam 166 continues to rotate until the follower 169 drops off the end of the cam surface 167 returning the reel drive motor 28 to the forward position. When the mechanism 165 reaches the position shown in FIG. 4, the switch 171 again is opened to turn off the motor 174, thereby leaving the reel drive motor in the forward position. The switch arm 172a returns into contact with the terminal 172b so that the voltage regulator 66 and the beep detector 133 no longer are disabled. Regulated power is supplied to the motor 28 and the device 10 can react to occurrence of the next beep tone. When that tone is received, the control flip-flop 135 will revert to its first stable state so that the device 10 will terminate remote playout and return to the normal answering operation.

During the remote controlled playout of the recorded messages, it is necessary to disable the reel erase head 38. Circuitry to accomplish this is shown in FIG. 8.

Drive current to the reel erase head 38 is supplied via a transistor 195. The base of the transistor 195 is connected to the junction of a pair of resistors 196, 197 connected in series from the +V line 67 to the control line 69. During operation in the answering mode the line 69 is low so that the transistor 195 is on. Positive voltage is supplied via the transistor 195, a line 198 and a resistor 199 to the erase head 38. When the flip-flop 135 switches to the remote playout mode the line 69 goes low. As a result, the transistor 195 goes off, disconnecting power from the erase head 38.

Ring Detector With Balanced Telephone Line Input

It is desirable that a telephone answering device present a balanced load to the telephone line. That is, the capacitance between each input terminal 11, 12 and ground should be equal so that the longitudinal line balance is not effected regardless of the polarity with which the telephone line pair is connected to the input terminals 11, 12. Such longitudinal line balance readily is achieved in a battery powered answering device, since such a device is totally isolated from common ground. However, if a commercial ac power line is used to power the device, some capacitance normally is present across the ac power transformer. As a result, using unbalanced ring detector circuits, one telephone line input terminal typically would present a different capacitance to ground then would the other input terminal. Longitudinal line balance could not be achieved.

In accordance with the present invention, this problem is overcome by using a balanced input transformer 13 which presents a condition of symmetry to the telephone line. The ring detector 14 (FIG. 9) thus presents the same value of impedance to ground at each of the telephone line input terminals 11, 12.

In the ring detector 14, each input terminal 11, 12 is connected via a respective current limiting resistor 201, 202 and a respective balanced transformer input winding 13a, 13b to a first pair of nodes 203a, 203b of a rectifier bridge 203. The other two bridge nodes 203c, 203d are effectively shorted together in response to ring detection when an SCR 204 begins conduction and turns on the transistor 64. This establishes a current path from the node 203c via a line 205, the SCR 204, a line 206, the base-to-emitter path of the transistor 64 and a line 207 to the node 203d. As a result, the primary windings 13a, 13b are effectively connected together in series across the telephone line when the transistor switch 64 is closed. This creates an effective "off-hook" condition and seizes the telephone line. More important, a balanced load is presented to the telephone line with each terminal 11, 12 presenting an equal impedance to ground. The secondary winding 13c advantageously is equally coupled to the primary windings 13a, 13b and serves to couple audio to and from the telephone line without altering the balance condition.

Ring detection is accomplished by using a pair of diodes 208, 209 to rectify the ac ring signal which is coupled to the telephone line via a capacitor 210. The diodes 208, 209 are connected in a voltage doubler circuit in which a capacitor 211 is charged on one-half the ac ring cycle via the diode 208 and an adjustable resistor 212. The setting of the resistor 212 establishes a ring delay so that the device will not answer an incoming call until one or more ring signals have occurred. Another capacitor 213 is charged via the diode 209 and a resistor 214. Turn-on of the transistor 64 occurs when the charge on the capacitor 213 reaches a sufficient level to fire a neon bulb 215. When this occurs, the capacitor 213 discharges via a pair of resistors 216, 217 and produces across a capacitor 218 a trigger pulse that is supplied to the gate of the SCR 204. When the SCR 204 goes on, a positive voltage is supplied from the bridge 203 to the base of the transistor 64 across a resistor 219. As a result, the transistor 64 goes on. This connects the power supply 15 to ground and completes the effective short circuit across the bridge nodes 203c, 203d so as to seize the telephone line.

It is possible that during the answering cycle the dc bias on the telephone line 12 may be interrupted, causing premature turn-off of the SCR 204. To prevent this, the supply positive terminal 15b is connected via the line 186, a resistor 220 and a diode 221 to the line 205. The value of the resistor 220 is selected to provide sufficient current to hold the SCR 204 in the conducting state should bias on the telephone line be interrupted. The diode 221 prevents the telephone line from being loaded by the resistor 220 and the power supply 15 during the standby period.

When the SCR 204 is conducting there will be a potential difference between the line 205 and the +V line 67. As a result, a capacitor 222 will be charged via the transistor 195, the line 198 and a resistor 223. The polarity at the capacitor terminal 222a will be positive with respect to line 205. At the end of the answering cycle, when the stop switch 62 (FIGS. 1, 3 and 9) is closed, the capacitor 222 will be connected across the SCR 204. The capacitor 222 will discharge through the SCR 204 with a polarity causing that SCR to turn off. This causes the transistor switch 64 to open disconnecting power from the device 10, and removing the load from the telephone line. These actions accomplish termination of the answering cycle.

Note that during the remote playout of recorded incoming messages, the gear 59 may make several revolutions, one for each recorded message that is played out. Thus during the remote playout, the STOP switch 62 will close a like plurality of times. The ring detector 14 must be conditioned to prevent turn-off of the device 10 when this occurs during remote playout.

This is accomplished with the circuit shown in FIGS. 8 and 9, since the turn-off capacitor 222 is charged via the transistor 195. When the control flip-flop 135 goes to the remote playout state, the low signal on the line 69 turns off the transistor 195. This disconnects the capacitor 222 from the +V line 67, thereby preventing subsequent charging of the capacitor 222 during the remote playout operation. Any charge previously stored by the capacitor 222 will quickly discharge via the path including the resistor 223, the line 198, the resistor 199 and the erase head 38. With the capacitor 222 discharged, closure of the STOP switch 62 during such remote playout will not result in turn-off of the SCR 204.

Another alternative method of obtaining a balanced input is to utilize a ring detector circuit such as that shown in the inventor's U.S. Pat. No. 3,909,538 entitled CONTROL CIRCUIT FOR TELEPHONE ANSWERING DEVICE WITH END OF TAPE DETECTION MEANS. A balanced input will be achieved using the circuit shown in FIG. 3 of that patent if the inductor 14 shown therein is replaced by the secondary winding of a 1:1 audio transformer. The primary of such transformer then is inserted in the line 30 of that FIG. 3 circuit, between the junction of the resistor 36 and the cathode of the SCR 38. A similar substitution may be made in the ring detector circuit shown in FIG. 3 of the inventor's U.S. Pat. No. 3,909,537 entitled TELEPHONE ANSWERING APPARATUS. In that circuit, the inductor 81 would be replaced by the secondary of a 1:1 transformer, with the primary inserted in the line 91 between the bridge 90 and the capacitor 103. Using such a transformer arrangement, the telephone answering devices of those patents may be powered from the ac power line, and will present a balanced input condition to the telephone line.

I claim:

1. A combined amplifier/flip-flop circuit comprising:
    a first audio amplifier connected to amplify a first audio signal applied to an audio input terminal of said first amplifier and to supply the amplified audio for utilization in a first audio channel,
    a second audio amplifier independently connected to amplify a different audio signal applied to an audio input terminal of said second amplifier and to supply the amplified audio for utilization in a different audio channel, and
    flip-flop interconnection means interconnecting the output of each amplifier to the input of the other amplifier so that the two amplifiers together function as a flip-flop, and wherein
    said first and second audio amplifiers each consists of an operational amplifier that is cut off by the application of a sufficient dc level to the audio input terminal thereof, each amplifier being set to produce an audio output that is superimposed on a dc level,
    said interconnection means connecting the output terminal of each amplifier to the audio input terminal of the other amplifier, whereby when one amplifier is on, the resultant dc level at its output will be fed to the audio input of, and thereby cut off, the other amplifier.

2. A circuit according to claim 1 wherein said interconnection means comprises a first diode and a first resistance connected in series from the output terminal of said second amplifier to the audio input terminal of said first amplifier, and a second diode and a second resistance connected in series from the output terminal of said first amplifier to the audio input terminal of said second amplifier.

3. A telephone answering device comprising:
    a combined amplifier/flip-flop circuit comprising:
        a first audio amplifier connected to amplify a first audio signal in a first audio channel, a second audio amplifier independently connected to amplify a different audio signal in a different audio channel, and flip-flop interconnection means interconnecting the output of each amplifier to the input of the other amplifier so that the two amplifiers together function as a flip-flop, said first audio amplifier being connection to amplify a prerecorded outgoing announcement and to supply the amplified announcement to the telephone line for transmission during an announcement transmit mode portion of the answering cycle, said second audio amplifier being connected to amplify messages incoming from the telephone line and to supply the amplified messages to a tape for recording thereon during an incoming message record mode portion of the answering cycle, said combined amplifier/flip-flop circuit also being used for mode control of said device, said device further comprising:

drive means, controlled by the state of said combined amplifier/flip-flop circuit, for enabling the transmission of said prerecorded announcement when said flip-flop circuit is in one state with the first amplifier enabled, and for enabling the driving of said tape when said flip-flop circuit is in the other state with the second amplifier enabled, and mode change means for setting said combined amplifier/flip-flop circuit to said one state at the beginning of the answering cycle and for toggling said combined amplifier/flip-flop circuit to the other state when transmission of said outgoing announcement is completed, whereby said combined amplifier/flip-flop circuit controls the mode of operation of said device.

4. A telephone answering device according to claim 3 wherein:

said first and second audio amplifiers each consists of an operational amplifier that is cut off by the application of a sufficient dc level to the audio input terminal thereof, and wherein each amplifier is set to produce an audio output that is superimposed on a dc level, said interconnection means connecting the output terminal of each amplifier to the audio input terminal of the other amplifier, whereby when one amplifier is on, the resultant dc level at its output will be fed to the audio input of, and thereby cut off, the other amplifier, and wherein said mode change means comprises:

a first capacitor effectively connected between the audio input of said first amplifier and ground, whereby when dc power is applied to said combined amplifier/flip-flop circuit at the beginning of answering cycle, said first capacitor will maintain the audio input terminal of said first amplifier near ground potential for a sufficient period of time so that the resultant dc level from the output terminal of said first amplifier will cut off said second amplifier, thereby setting said flip-flop to said one state at the beginning of the answering cycle.

5. A telephone answering device according to claim 4 wherein said outgoing announcement is prerecorded on a magnetic tape loop, said loop also having a conductive strip that shorts a set of contacts after complete transmission of said announcement, said mode change means for toggling comprising:

said set of contacts, a second capacitor having a capacitance value substantially greater than said first capacitor, and means for charging said second capacitor while said announcement is being transmitted, said second capacitor being connected across said first capacitor via said set of contacts so that when said contacts are shorted at the end of announcement transmission, the charge on said second capacitor will provide sufficient dc input to the audio input terminal of said first amplifier to cut off said first amplifier, the resultant drop in dc input to the audio input terminal of said second amplifier thereby permitting said second amplifier to go on, the resultant output dc level of said second amplifier thereafter maintaining said first amplifier cut off, whereby toggling of said flip-flop is accomplished.

6. A telephone answering device according to claim 3 wherein said announcement is prerecorded on a magnetic tape loop, and wherein said drive means comprises:

a first motor for driving said announcement tape loop, a second motor for driving said incoming message recording tape, a motor drive circuit, responsive to a dc control signal, for providing current only to one of said motors when said control signal is above a certain dc level and for providing current only to the other of said motors when said control signal is below said certain dc level, said dc control signal being obtained from the output terminal of one of said first or second audio amplifiers.

7. A telephone answering device according to claim 3 and adapted for remote controlled playout over said telephone line of recorded incoming messages in response to receipt of a beep tone during transmission of said outgoing announcement, said device comprising:

a beep detector for detecting the receipt of a beep tone from the telephone line, and a remote playout control flip-flop toggled by said beep detector upon receipt of a beep tone, for switching said device from a telephone answering mode of operation to a remote playout mode of operation, and wherein said combined amplifier/flip-flop circuit is connected to said remote playout control flip-flop so as to inhibit toggling thereof when said combined amplifier/flip-flop circuit is in said other state with said second amplifier enabled, whereby receipt of a beep tone during the incoming message record mode will not cause said device to switch into said remote playout mode.

8. In a telephone answering device in which a prerecorded outgoing announcement is transmitted to the telephone line during an announcement transmit mode portion of the answering cycle, and wherein a message incoming from the telephone line is recorded on a tape during the following incoming message record mode, said device having means for remote controlled playback over said telephone line of recorded incoming messages, and including a loop playback head associated with said announcement tape loop and a tape playback head associated with said incoming message recording tape, the improvement wherein said device has an audio amplifier connected to amplify audio for transmission to said telephone line, and wherein said loop playback head and said tape playback head both are directly continuously connected to the same audio input terminal of said amplifier using no switch that alternately connects said two heads to said same audio input terminal.

* * * * *